May 19, 1931. C. K. PARKER ET AL 1,806,020
PROCESS FOR REVIVIFYING USED DECOLORIZING MATERIALS
Filed Aug. 22, 1927
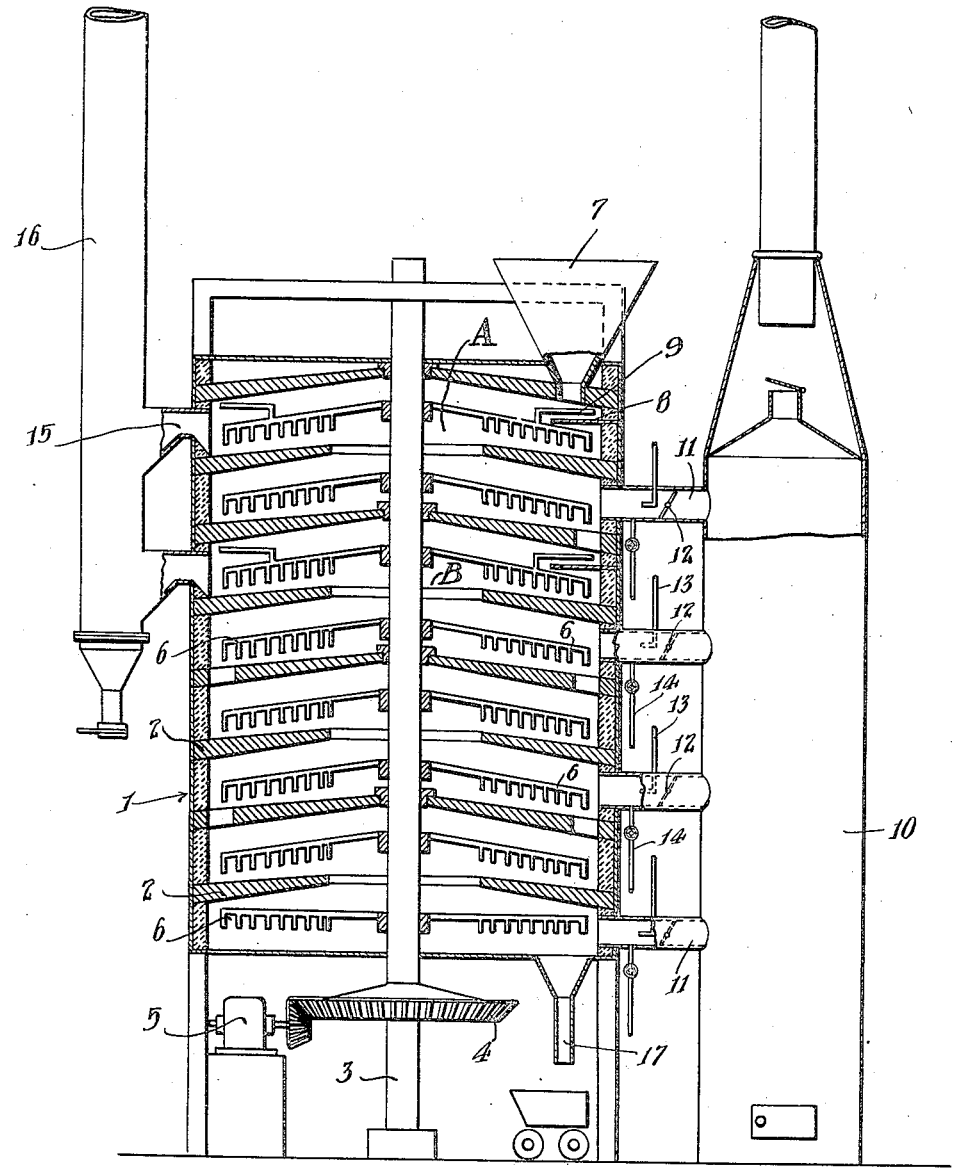
Inventors
Charles K. Parker
Frank A. Bent
By Lyon & Lyon
Attorneys Patented May 19, 1931

1,806,020

UNITED STATES PATENT OFFICE

CHARLES K. PARKER, OF RICHMOND, AND FRANK A. BENT, OF BERKELEY, CALIFORNIA, ASSIGNORS TO STANDARD OIL COMPANY OF CALIFORNIA, OF SAN FRANCISCO, CALIFORNIA, A CORPORATION OF DELAWARE

PROCESS FOR REVIVIFYING USED DECOLORIZING MATERIALS

Application filed August 22, 1927. Serial No. 214,562.

This invention relates to the treatment of decolorizing or purifying material that has been used in the refining and purification of petroleum oil and as a consequence of such use has lost a portion of its efficiency. The invention discloses a process of treating the spent clay to restore its efficiency to such a degree as to permit of its being reused a considerable number of times.

An object of this invention is to disclose a process by means of which decolorizing clays can be revivified without permanently reducing the efficiency of said clays. Another object is to disclose a process of removing carbonized hydrocarbon from decolorizing clays without permanently injuring the decolorizing capacity of said clay. Another object is to disclose a process of removing carbonized hydrocarbons without substantial loss of the combined water present in such clays.

In the refining of mineral oils it has often been customary to filter the oils through or in some manner contact them with decolorizing earths, commonly called decolorizing clays. After a clay has been so used, its efficiency is impaired and it is common practice to wash the clay free from soakage oil with light naphtha, followed by blowing with steam to remove residual naphtha and finally blowing with air to partially dry the clay. The clay is then burned to remove the adsorbed impurities. The conditions of burning as ordinarily performed, may all be classified as being at some stage exothermic, that is to say the impurities in the clay are burned under such conditions as to cause the giving out of heat due to oxidation of the impurities in the clay. As a result of such processes, the internal structure of the clay is changed, due, probably, to the loss of water of constitution, and the efficiency of the clay is thus greatly reduced.

We have found that two factors are responsible for deterioration of the clay. One factor is residual carbon remaining in the clay after burning, which closes the pores and prevents contact with the oil. This carbon can be removed by burning or oxidation if sufficient air and time are used. The other factor is removal of combined water from the clay by using excessive, although customary, burning temperatures. This has a permanent effect on the efficiency of the clay as the material cannot be readily rehydrated once this water of hydration is lost. Noticeable dehydration occurs at approximately 900° F. and it becomes more rapid as the temperature increases. At burning temperatures of 1200° F. it is sufficient to decrease the value of the clay very rapidly. The customary method of burning the spent clay in direct contact with an oxidizing flame results in excessive temperatures owing to combustion of the oil and carbon in the spent clay with the result that although the temperature of the exit gases from the kiln may be below the temperature at which dehydration of the clay takes place, nevertheless there are temperatures within the body of clay in the kiln that may go as high as 1600° F. with the result that a considerable portion of the water of hydration is lost and the quality of the clay greatly and permanently impaired.

This invention discloses a method whereby the impurities in the clay are removed in such a way as to in no way change the internal structure of the clay. In order to acquaint others with our process the following detailed description is given.

Used clay, which may have been washed with a light distillate and air blown if desired, is preferably first heated to a temperature of 750° F. to 950° F. in the presence of an inert gas. This is done to, first, distill a portion of the impurities, and secondly, to decompose a part of the residual impurities remaining in the clay to form carbon. The necessary heat may be supplied by means of external firing of the kiln or by means of hot inert gases, such as steam or flue gases, or by a combination of any two or all three of these means. A mixture of steam and air can also be used. The heating may be conducted at atmospheric pressure or under a partial vacuum. With any of the above forms of heating the adsorbed impurities are partly distilled and partly pyrogenetically decomposed to form distillable oils, gas and a residue of carbon which temporarily remains in the clay. Temperatures substantially above 950° F. (at atmospheric pressures) should be avoided because of the danger of overheating the clay and thus causing loss of water of hydration and thereby permanently impairing the desirable qualities of the clay. Although any inert gas may be introduced into the kiln during this first heating step we prefer to use steam because the steam combines with a part of the carbon in an endothermic reaction to give carbon monoxide, carbon dioxide, and hydrogen, thus absorbing heat from the contents of the kiln and keeping the temperature below the point at which dehydration of the clay takes place. This reaction is noticeable at temperatures above 750° F. and can be represented by the following thermo-chemical equations:

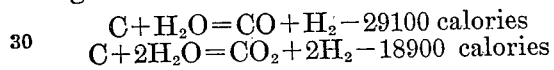

The second step in the process is the substantially complete gasification of the carbonized impurities remaining in the clay after the first purification step. The second step may be carried out in the same kiln as the first step but we prefer to introduce the partially revivified clay into a second retort for the second step of the process. In this step the kiln is again heated by some means other than direct fire, for instance, by means of external heat and a current of steam and air or oxygen, or a current of steam and inert gases such as flue gases, with air or oxygen. Steam or some other substance which will remove the carbon without the necessity of employing temperatures at which dehydration of the clay takes place must be employed in the second step in order to prevent deterioration of the clay. We prefer to employ steam and air so that the carbonized residue in the clay is substantially completely oxidized or gasified at temperatures below that at which the clay deteriorates. The temperatures employed in this second step may range from approximately 750° F. to approximately 1150° F. although we prefer to employ a temperature of about 950° F. It is possible that the clay itself serves to catalyze the oxidation of the carbon which is present in a very thin film upon it, thus lowering the temperature at which the reaction proceeds. The reaction in this step is partly similar to that in the preceding step, the steam being employed in order to produce an endothermic reaction, thereby preventing local overheating of the clay and partly an oxidation of the carbon by the oxygen present in the air. It is important to proportion the steam so as to prevent the evolution of heat and yet produce sufficient oxidation to remove the carbon.

Although the process of the present invention may be carried out in many different types of apparatus, we will describe one type of apparatus in order to enable those skilled in the art to more readily understand the invention.

The attached drawing illustrates diagrammatically a vertical section of a multiple hearth furnace suitable for use in the practice of our invention. The furnace is similar to those commonly used in metallurgical work and consists of a cylindrical shell lined with a refractory material 1 and a plurality of hearths 2 also of refractory material. Each hearth is provided with openings through which the material under treatment falls to the hearth below. A shaft 3 extends through the vertical axis of the furnace and may be driven by any suitable means, for example, gearing 4, and motor 5. Revolution of the shaft 3 causes arms 6 to revolve, said arms being equipped with rabble teeth or rakes.

Material to be treated may be fed into the furnace from a hopper 7. The material from this hopper passes through a feeding device, which comprises a flat plate 8 spaced slightly below the lower end of the feed hopper, the material from hopper 7 forming a small mound upon this plate, thus cutting off the passage of gases between the hopper and the interior of the furnace. This material on plate 8 is successively removed by a plurality of revolving arms 9 attached to the rabble arm 6 and falls upon the hearth 2. A similar feeding device is placed in the opening between the second and third hearths, or at any other suitable point in the furnace, and functions in the same manner, preventing the passage of gases from the lower section B of the furnace into the upper section A.

Heat may be supplied to the furnace by means of flue gases from a generator 10 which pass through the various flues 11 into the furnace. The amount of flue gases entering the furnace is regulated by dampers 12 and the character of the atmosphere within the furnace is modified by the admission of steam through the pipes 13 or the admission of air through the ports 14. After traversing the treating chamber or furnace the gases escape through ports 15 and stack 16. If desired, the vapors or gases from the upper section of the furnace may be drawn off through a separate vent and recovered. The bottom part of the furnace is equipped with an opening 17 through which the treated material is discharged.

In the operation of the furnace described above we prefer to keep the upper compartment A at a temperature not exceeding 950° F. to remove the more easily vaporized impurities and to carbonize the residue. Ordinarily we introduce only flue gases and steam into this compartment along with the clay to be revivified.

The partially revivified clay which passes into lower compartment B contains substantially only a carbonized residue. Hot flue gases, air and steam are introduced, the air furnishing the oxygen required to convert a part of the carbon to CO or $CO_2$. The introduction of steam into this lower compartment B also removes a part of the carbon by forming CO and $CO_2$ as in the upper compartment. If it were not for the presence of the steam in the lower compartment, the temperature would rise to such a degree that the clay would be overheated and deteriorated.

It is to be understood that any suitable apparatus may be used and we are not to be limited to the application of our process to the particular apparatus described. Our invention pertains broadly to the removal of hydrocarbons from used decolorizing clays by distillation and carbonization at relatively low temperatures, and the removal of carbonized hydrocarbons under conditions which do not dehydrate or substantially reduce the combined moisture content of such clays.

We claim:

1. A process of revivifying used decolorizing clays, comprising distilling and partially carbonizing hydrocarbons present in said clays in the presence of added steam and air, and then removing the carbonized impurities by producing an endothermic reaction in the presence of steam, without substantial loss of combined water of the clay.

2. A process of revivifying spent decolorizing clays containing hydrocarbons, comprising distilling and partially carbonizing the hydrocarbons in the presence of an inert gas at a temperature between 750° and 950° F. and then removing carbonized hydrocarbons by producing endothermic reactions in the presence of steam and air, without substantial loss of combined water of the clay.

3. In a continuous process of revivifying decolorizing clays, the steps of heating the clays to a temperature of between 950 and 1150° F., in a reaction zone, introducing steam into said zone, and removing carbonized hydrocarbons from said clays without substantial loss of combined water of the clays in said zone.

4. A continuous process of revivifying decolorizing clays, comprising distilling a clay containing hydrocarbons in an inert atmosphere to remove said hydrocarbons and reduce the carbon content of said clay, and then oxidizing said clay in the presence of steam at a temperature below about 1150° F.

5. A continuous process of revivifying decolorizing clays, comprising distilling a clay containing hydrocarbons in an inert atmosphere and at a temperature not exceeding about 950° F., to remove said hydrocarbons and reduce the carbon content of said clay, and then oxidizing said clay in the presence of steam at a temperature below about 1150 degrees F.

Signed at Richmond, Cal., this 9th day of August, 1927.

CHARLES K. PARKER.
FRANK A. BENT.